S. A. DUNCAN.
DETACHABLE HANDLE.
APPLICATION FILED SEPT. 16, 1913.
1,140,967.  Patented May 25, 1915.
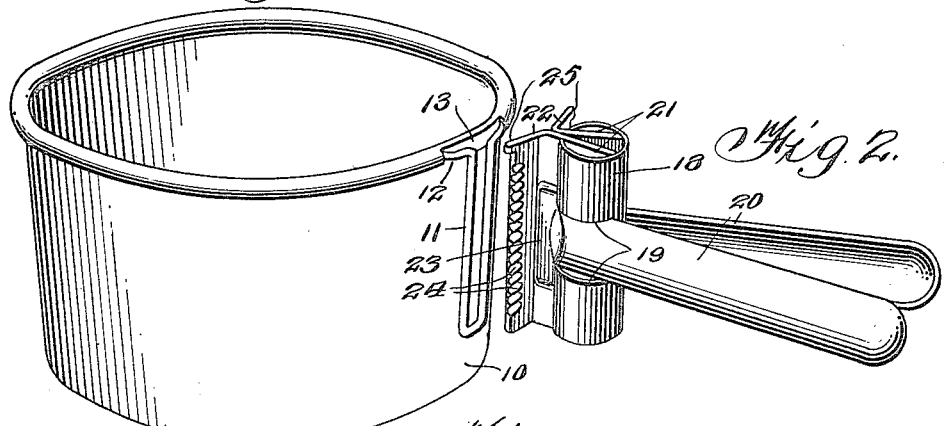
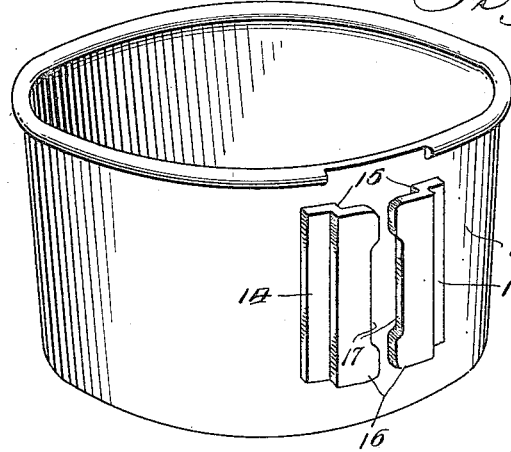
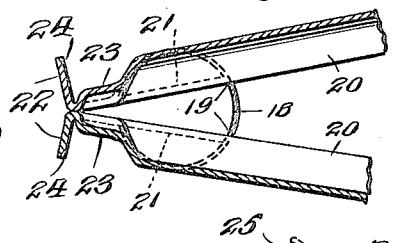
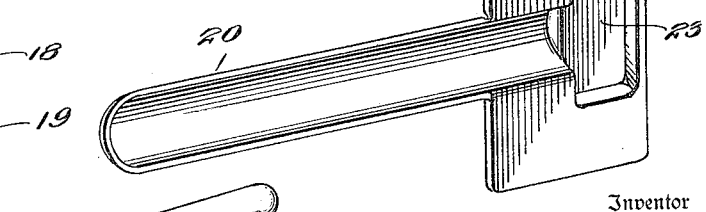
Inventor
Sylena A. Duncan
Witnesses
By Mason Fenwick Lawrence
Attorneys

UNITED STATES PATENT OFFICE.

SYLENA A. DUNCAN, OF NESHANIC, NEW JERSEY.

DETACHABLE HANDLE.

1,140,967.  Specification of Letters Patent.  Patented May 25, 1915.

Application filed September 16, 1913. Serial No. 790,140.

*To all whom it may concern:*

Be it known that I, SYLENA A. DUNCAN, a citizen of the United States, residing at Neshanic, in the county of Somerset and State of New Jersey, have invented certain new and useful Improvements in Detachable Handles; and I do hereby declare the following to be a full, clear, and exact description of the invention, such as will enable others skilled in the art to which it appertains to make and use the same.

This invention relates to cooking utensils and more particularly to detachable handles for use therewith.

It has for an object to provide an improved form of a handle and coacting means carried by a utensil for the reception of said handle.

It has also for an object to provide a handle of this character made after the pattern of expanding tongs whose jaws may be inserted in any suitable and properly-shaped opening and distended by compressing the handle grips.

These objects are carried out by constructing the invention in the manner set forth in the following specification, appended claims and drawings, in which, Figure 1 is a perspective view of a saucepan with one form of a handle receiving member attached thereto, Fig. 2 is a perspective view of a detachable handle, Fig. 3 is a perspective view of a saucepan with another form of handle receiving means secured thereto, Fig. 4 is a horizontal sectional view through a portion of a handle, Fig. 5 is a perspective view of the spring member removed from the handle and Fig. 6 is a perspective view of one of the handle members. Fig. 7 is a side elevation of a modified form of handle.

Referring to the drawings there is shown a cooking utensil 10 which has a wire or similar loop 11 secured thereto which loop 11 is formed in the strand of wire 12 which encircles the saucepan or similar utensil within a bead formed about the upper edge thereof and where the bead is cut away at 13 to permit the wire 12 to be exposed the loop 11 is formed and bent down against the side of the saucepan.

In Fig. 3 of the drawings the utensil is provided with plates 14 which may be riveted or otherwise secured thereto and from these plates extend the offsets 15 which have cheek plates 16 formed thereon. These offsets and cheek plates are spaced apart to permit engagement of jaws carried by the handle to be hereinafter described; and, to assist said jaws in firmly engaging said cheek plates, they are recessed as at 17 to receive bosses formed on the handle members as will be described.

The handle member comprises a spring 18 which is rolled into a cylinder but its edges not connected with each other although they meet as shown in Fig. 5, its sides at the center of its length being cut away as at 19 to receive the hand holds or grips 20 shown in Fig. 6. Said grips at their front end extend integrally into plates 21 which are of a size to stand upright within the cylindrical end portion of the spring 18 as seen, and the tendency of the spring is to throw the front edges of these plates into contact with each other, whereas the disposition of the grips 20 within the cut-away portion 19 of the spring holds the rear edges of the plates out of contact with each other. Such front edges of the plates extend through the open side of the spring, and have lateral jaws 22 which when the handle is applied to the utensil pass either between the loop 11 and the utensil or the cheek plates 16 and the utensil. The plates 21 are provided with bosses 23 which as shown in Figs. 4 and 6 may be formed by stamping the handle members to such configurations. When the handle is applied to the utensil as shown in Fig. 3 these bosses engage the recesses 17 and assist in locking the handle and utensil in fixed relation when the handles 20 are gripped as by a person.

The lateral jaws may have the edges thereof serrated as at 24, and the upper edge of each jaw terminates in a tongue 25 which tongue when the handle is applied limits the downward movement thereof. The serrations 24 are intended for engagement with curved portions of the wire 12 when the jaws 22 do not pass completely down into the loop 11, or when the loop 11 is secured to a shallow pan, or when on account of obstructions, the handles are not desired to be moved downwardly to a limited position. The engagement is had by passing the reduced edges, formed by the serrations into the reduced opening formed by the curved members 12.

Various modifications may be made within the scope of this invention without departing from the spirit thereof and the drawings are submitted for illustrative purposes only.

As shown in Fig. 7 of the drawings, the handle has grips extending upwardly at an angle from the spring portion, and from near the upper edge thereof. This arrangement enables the handle being applied to a utensil when several utensils are on a stove or the like, by permitting the grips to pass over the adjacent utensils.

Having thus described my invention, I claim:

1. The herein described detachable handle comprising a cylindrical spring split down its front and having cut-away portions in its opposite sides at its mid-length, a pair of grips passing through said cut-away portions, upright plates integral with the front ends of said grips and standing within said spring and projecting through its front, and jaws on the front edges of said plates forward of the spring, for the purpose set forth.

2. The herein described detachable handle comprising a cylindrical spring split down its front and having cut-away portions in its opposite sides at its mid-length, a pair of grips passing through said cut-away portions, upright plates connected with the front ends of said grips and standing within said spring and projecting through its front, and jaws on the front edges of said plates extending away from each other forward of the spring, the outer edges of said jaws being serrated, for the purpose set forth.

3. The herein described detachable handle comprising a cylindrical spring split down its front and having cut-away portions in its opposite sides, a pair of grips passing through said cut-away portions, upright plates connected with the front ends of said grips and standing within said spring and projecting through its front, and jaws on the plates extending away from each other forward of the spring, the outer edges of said jaws being serrated and having tongues at their upper corners projecting beyond said serrations, for the purpose set forth.

4. The herein described detachable handle comprising a cylindrical spring split down its front and having cut-away portions in its opposite sides at its mid-length; combined with a handle consisting of a pair of grips passing through said cut-away portions, upright plates integral with the front ends of said grips and standing within said spring, the plates being stamped with outwardly projecting bosses extending through the cut-away portions and the plates themselves projecting through the front side of the spring, and jaws carried by the front projecting edges of the plates, for the purpose set forth.

5. The combination with a utensil having a wire in its bead, the latter being cut-away at one side and the wire projecting through the cut-away portion and formed into a dependent loop; of a handle comprising a pair of upright plates whose front edges are bent at angles into jaws extending away from each other and adapted to pass into the upper end of said loop, grips extending rearwardly from said plates and normally diverging from each other, and a spring for holding the front edges of the plates normally in contact with each other, for the purpose set forth.

In testimony whereof I affix my signature in presence of two witnesses.

SYLENA A. DUNCAN.

Witnesses:
ANNA R. MATZKIN,
K. TAKOGI.

Copies of this patent may be obtained for five cents each, by addressing the "Commissioner of Patents, Washington, D. C."